United States Patent
Delgado-Nanez (10) Patent No.: US 12,328,093 B2
(45) Date of Patent: Jun. 10, 2025

(54) FASTENING ASSEMBLY FOR SOLAR POWER SYSTEMS AND TOOLS THEREOF

(71) Applicant: Nextracker LLC, Fremont, CA (US)

(72) Inventor: Ricardo Delgado-Nanez, San Jose, CA (US)

(73) Assignee: NEXTRACKER LLC, Fremont, CA (US)

( * ) Notice: Subject to any disclaimer, the term of this patent is extended or adjusted under 35 U.S.C. 154(b) by 141 days.

(21) Appl. No.: 17/975,523

(22) Filed: Oct. 27, 2022

(65) Prior Publication Data

US 2023/0128834 A1  Apr. 27, 2023

Related U.S. Application Data

(60) Provisional application No. 63/272,664, filed on Oct. 27, 2021.

(51) Int. Cl.
| | | |
|---|---|---|
| *B65D 63/08* | (2006.01) | |
| *B65D 63/10* | (2006.01) | |
| *H02S 20/10* | (2014.01) | |
| *H02S 30/10* | (2014.01) | |

(52) U.S. Cl.
CPC .......... *H02S 20/10* (2014.12); *B65D 63/1018* (2013.01); *H02S 30/10* (2014.12); *Y10T 24/1473* (2015.01)

(58) Field of Classification Search
CPC ............ Y10T 24/1473; Y10T 24/1414; Y10T 24/141; Y10T 24/1402; Y10T 24/1406; Y10T 24/14; F16L 3/233; B65D 63/08; B65D 63/1018
See application file for complete search history.

(56) References Cited

U.S. PATENT DOCUMENTS

| | | | | |
|---|---|---|---|---|
| 5,850,674 | A | * | 12/1998 | Jansen ................... B65D 63/08 24/21 |
| 6,076,235 | A | * | 6/2000 | Khokhar ................ B65D 63/08 24/23 W |
| 7,121,122 | B2 | | 10/2006 | Levi |
| 7,669,293 | B2 | * | 3/2010 | Huang .................. F16L 3/2338 24/20 R |
| 8,939,648 | B2 | | 1/2015 | Schneider et al. |
| 9,206,999 | B2 | | 12/2015 | Reed et al. |
| 9,254,949 | B2 | * | 2/2016 | Dinh ...................... B65D 63/00 |
| 9,395,104 | B2 | | 7/2016 | Grushkowitz |
| 9,845,824 | B2 | | 12/2017 | Lamb et al. |
| 9,923,510 | B2 | | 3/2018 | Au |
| 10,093,465 | B2 | * | 10/2018 | Rufty ........................ F16B 2/08 |
| 10,536,109 | B2 | | 1/2020 | Corio |
| 10,622,937 | B2 | | 4/2020 | Pesce et al. |
| 10,720,877 | B2 | | 7/2020 | Haas et al. |
| 10,845,092 | B2 | | 11/2020 | Dally |
| 10,917,039 | B2 | | 2/2021 | Corio |
| 10,931,224 | B2 | | 2/2021 | Praca et al. |
| 11,035,591 | B2 | | 6/2021 | Childress |

(Continued)

OTHER PUBLICATIONS

PCT Search Report and Written Opinion issued in PCT Application No. PCT/US2022/048104 dated Mar. 2, 2023.

*Primary Examiner* — Jason W San
*Assistant Examiner* — Michael S Lee
(74) *Attorney, Agent, or Firm* — Fredrikson & Byron, P.A.

(57) ABSTRACT

The present disclosure relates to fastening assemblies for solar power systems including at least a strap, a buckle member, and a locking member.

14 Claims, 11 Drawing Sheets

(56) References Cited

U.S. PATENT DOCUMENTS

| | | |
|---|---|---|
| 11,271,518 B2 | 3/2022 | Ballentine et al. |
| 11,515,832 B2 | 11/2022 | Taha et al. |
| 11,525,604 B1 | 12/2022 | Delgado-Nanez et al. |
| 11,563,402 B2 | 1/2023 | Corio |
| 2003/0204936 A1 | 11/2003 | Caveney |
| 2008/0308094 A1 | 12/2008 | Johnston |
| 2010/0229350 A1* | 9/2010 | Kostal ............... E05B 75/00 24/16 PB |
| 2012/0124783 A1 | 5/2012 | DeBerry et al. |
| 2012/0279018 A1 | 11/2012 | DeBerry et al. |
| 2013/0039610 A1 | 2/2013 | Schneider et al. |
| 2013/0333164 A1* | 12/2013 | Dinh ............... B65D 63/08 24/16 R |
| 2013/0341934 A1 | 12/2013 | Kawanishi |
| 2014/0090637 A1 | 4/2014 | Grushkowitz |
| 2014/0237772 A1 | 8/2014 | Crouse |
| 2014/0325796 A1 | 11/2014 | Mayo et al. |
| 2015/0059826 A1 | 3/2015 | Reed et al. |
| 2015/0059827 A1 | 3/2015 | Reed et al. |
| 2015/0144751 A1 | 5/2015 | Schneider et al. |
| 2015/0288326 A1 | 10/2015 | Au |
| 2016/0123383 A1 | 5/2016 | Lamb et al. |
| 2017/0102168 A1 | 4/2017 | Childress |
| 2017/0229998 A1 | 8/2017 | Molina et al. |
| 2017/0250648 A1 | 8/2017 | Haas et al. |
| 2017/0353146 A1 | 12/2017 | Praca et al. |
| 2017/0359017 A1 | 12/2017 | Corio |
| 2020/0088446 A1 | 3/2020 | Dally |
| 2020/0153382 A1 | 5/2020 | Ballentine et al. |
| 2020/0162016 A1 | 5/2020 | Corio |
| 2020/0195192 A1 | 6/2020 | Sk |
| 2021/0013828 A1 | 1/2021 | Hudson et al. |
| 2021/0041145 A1 | 2/2021 | Dally |
| 2021/0159849 A1 | 5/2021 | Corio |
| 2021/0194416 A1 | 6/2021 | Praca et al. |
| 2021/0194418 A1 | 6/2021 | Ballentine et al. |
| 2021/0293455 A1 | 9/2021 | Au |
| 2022/0085753 A1 | 3/2022 | Kumar et al. |
| 2022/0149773 A1 | 5/2022 | Reznar et al. |
| 2022/0186775 A1 | 6/2022 | Taha et al. |
| 2022/0186982 A1 | 6/2022 | Taha et al. |
| 2022/0190776 A1 | 6/2022 | Taha et al. |
| 2022/0193927 A1 | 6/2022 | Mazzetti, Jr. et al. |
| 2022/0200520 A1 | 6/2022 | Dally |

\* cited by examiner

FASTENING ASSEMBLY FOR SOLAR POWER SYSTEMS AND TOOLS THEREOF

CROSS-REFERENCE TO RELATED APPLICATION

This application claims the benefit of, and priority to, U.S. Provisional Patent Application Ser. No. 63/272,664, filed on Oct. 27, 2021, the entire content of which is hereby incorporated by reference herein.

BACKGROUND

Technical Field

The present technology is generally related to fastening assemblies for solar power systems, and more particularly, fastening assemblies designed for securing a first support structure of a solar power system to a supplemental support structure and/or a solar module of a solar power system, the assemblies including at least a strap, a buckling member, and a locking member.

Description of Related Art

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

Solar modules can employ solar panels made of silicon or other materials (e.g., III-V cells such as GaAs) to convert sunlight into electricity. Solar panels typically include a plurality of photovoltaic (PV) cells interconnected with wiring to one or more appropriate electrical components (e.g., switches, inverters, junction boxes, etc.).

Most solar power systems place an array of solar modules at a location where sunlight is readily present. This is especially true for residential, commercial, or industrial applications in which multiple solar modules are desirable for generating substantial amounts of energy.

In some arrangements, solar modules are placed side-by-side in an array. Each solar module and/or array can be mounted to a fixed or rotatable support system. The support system may include one or more of a ground-based structure (e.g., a pole or generally vertical post), a support structure (e.g., a torque tube or generally horizontal beam), and/or a mounting rail (e.g., a saddle or transverse rail) configured to mount the solar module or array on the support structure.

The assembly process of the solar power system can be physically challenging and inefficiently time-consuming because space can be limited between each of the modules, arrays, structures and/or rails. Particularly, space above the support structure may be limited by the mounting rails, saddles, and/or solar modules, potentially making assembly work performed above the support structure more difficult, less desirable, and/or time consuming as compared to performing similar work from below the support structure where there may be more room to operate. Thus, there remains a continuing need for improved methods for fastening and/or mounting solar modules and/or supplemental support structures (e.g., mounting rails, saddles, etc.) to a primary support structure (such as a torque tube, ground base support structure, etc.) of a solar power system, such as a solar tracker.

SUMMARY

The present disclosure describes a fastening assembly for a solar power system including at least a locking member, a strap including an elongate body extending between a first end portion and an opposite second end portion, and a buckle member configured to receive both the locking member and the strap therein and/or therethrough.

The buckle member includes a locking cavity defined therein and a strap channel defined therethrough. In some embodiments, the locking cavity overlaps and/or is in communication with the strap channel. The strap channel being configured to receive a portion of the strap through the buckle member. The locking cavity includes a tapered end portion configured to receive the locking member therein to lock the strap in a fixed position relative to the buckle member. In some embodiments, the tapered end portion configured to wedge the locking member against the strap if the strap tries to back out of the buckle member once locked. In some embodiments, the fastening assembly is self-locking.

In some embodiments, the buckle member defines a top face, a bottom face opposite the top face, a front face, a rear face opposite the front face, a first side face, and a second side face opposite the first side face, wherein the strap channel extends from a portion of the first side face to a portion of the second side face through the buckle member.

In some embodiments, the buckle member may further include an opening in communication with the locking cavity, the opening defined through the bottom face of the buckle member and configured to pass the locking member therethrough into or out of the locking cavity and/or the buckle member.

In some embodiments, the buckle member may further include a slot in communication with the locking cavity and the strap channel, the slot defined through the first side face of the buckle member and configured to allow a device therethrough to advance the locking member towards the tapering portion of the locking cavity. In some embodiments, the device may be part of a tensioning tool used to tension the strap around a support structure as described herein. In some embodiments, the slot is narrower than the strap channel to prevent the strap from entering the slot.

In some embodiments, the tapered end portion of the locking cavity further includes a recess positioned below the strap channel to receive a portion of the locking member therein.

Hand-held strap tensioning tools configured to be used with the fastening assemblies described herein are also provided. The hand-held tools are portable and include at least a handle, a strap tensioning tool assembly operatively coupled to a handle, the strap tensioning tool assembly configured to perform one or more strap tensioning operations, and a power assembly operatively coupled to both the handle and the strap tensioning tool assembly.

In some embodiments, the hand-held strap tensioning tools may be driven by a gear and/or rotary motor.

In some embodiments, the hand-held strap tensioning tool may be hydraulically driven.

Kits for a solar power system are also provided. Each kit includes one or more of the fastening assemblies described herein. Each fastening assembly including a locking member, a strap, and a buckle member having a locking cavity defined therein and a strap channel defined therethrough, the locking cavity in communication with the strap channel, the strap channel configured to receive a portion of the strap through the buckle member and the locking cavity including a tapered end portion configured to receive the locking member therein to lock the strap in a fixed position relative to the buckle member. The kits may further optionally include a hand-held tensioning tool, a solar module, or one or more support structures for the solar power system.

Methods of use of the fastening assemblies and tools are also provided herein.

BRIEF DESCRIPTION OF THE DRAWINGS

Various aspects and features of the present disclosure are described herein below with reference to the drawings, wherein.

DETAILED DESCRIPTION

The present disclosure describes a fastening assembly for use with a solar power system. The solar power system may be any type of solar power system, such as a fixed solar power system or a solar tracker power system. In particular embodiments, the solar power system is a solar tracker system.

Figure 1:
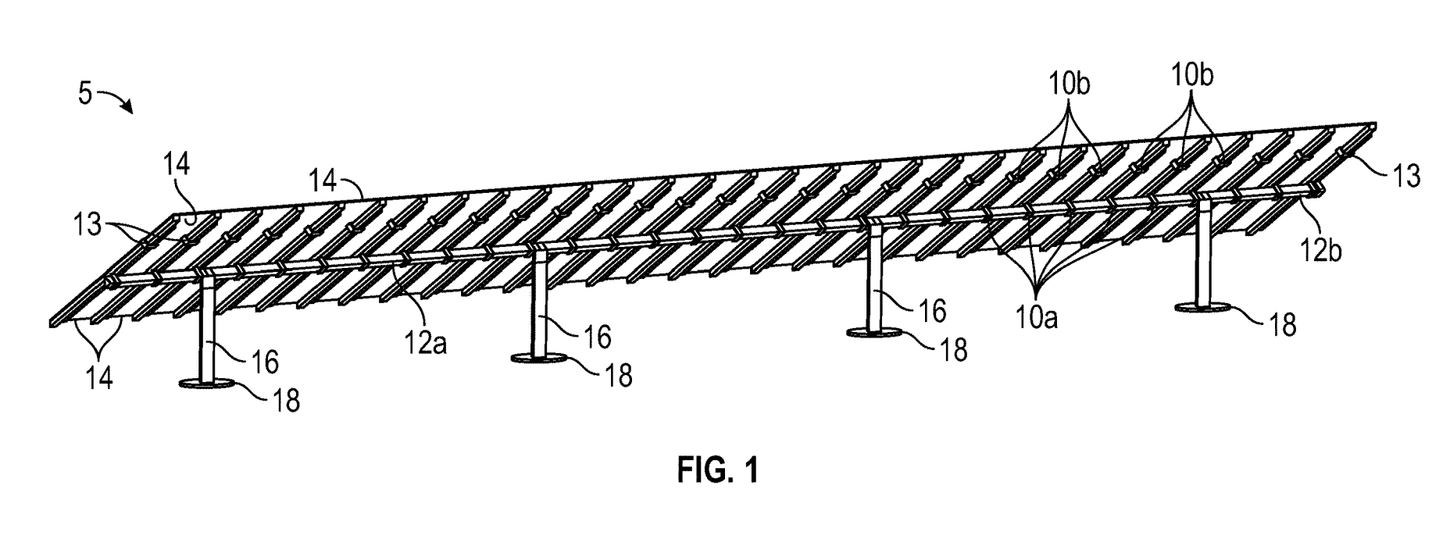
FIG. 1 depicts a perspective view of a solar power system including one or more fastening assemblies as described in at least one embodiment herein.

As shown in FIG. 1, a solar power system 5 as described herein, and particularly a solar tracking power system 5, may include at least one or more base support structures 16 (e.g., a pile), one or more supplemental support structures 12, 13 (e.g., a torque tube, mounting rail, and/or saddle), an array of solar modules 14 mounted thereon, and one or more fastening assemblies 10a, 10b as described herein.

In some embodiments, a plurality of fastening assemblies 10a are shown securing and/or locking one supplemental support structure 13 (e.g., a mounting rail or saddle) to another supplemental support structure 12 (e.g. a torque tube or generally horizontal beam). In some embodiments, a plurality of second fastening assemblies 10b are shown securing and/or locking one or more of the solar modules 14 to a supplemental support structure 13 (e.g., a mounting rail or saddle).

Figure 2A:
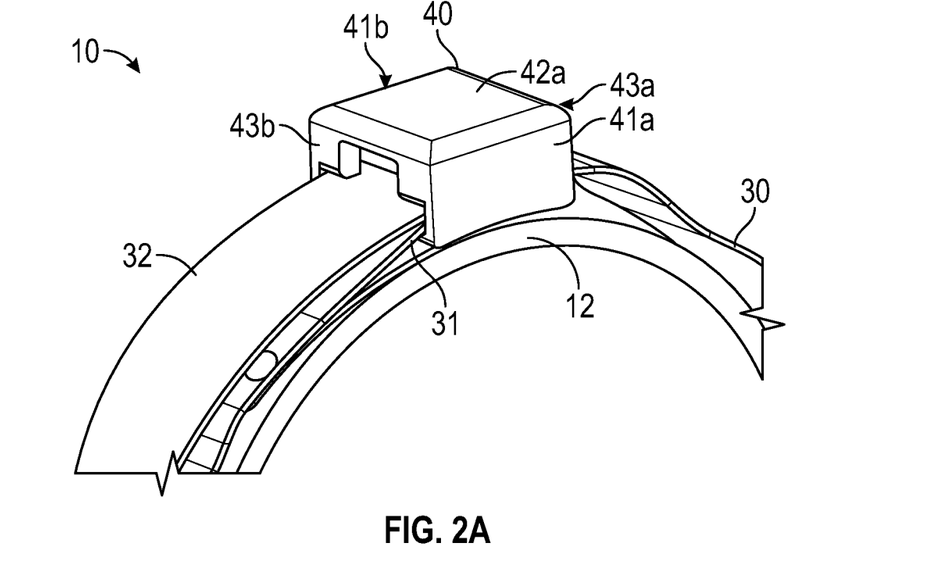
FIG. 2A is a perspective view of a fastening assembly as described in at least one embodiment herein.
Figure 2B:
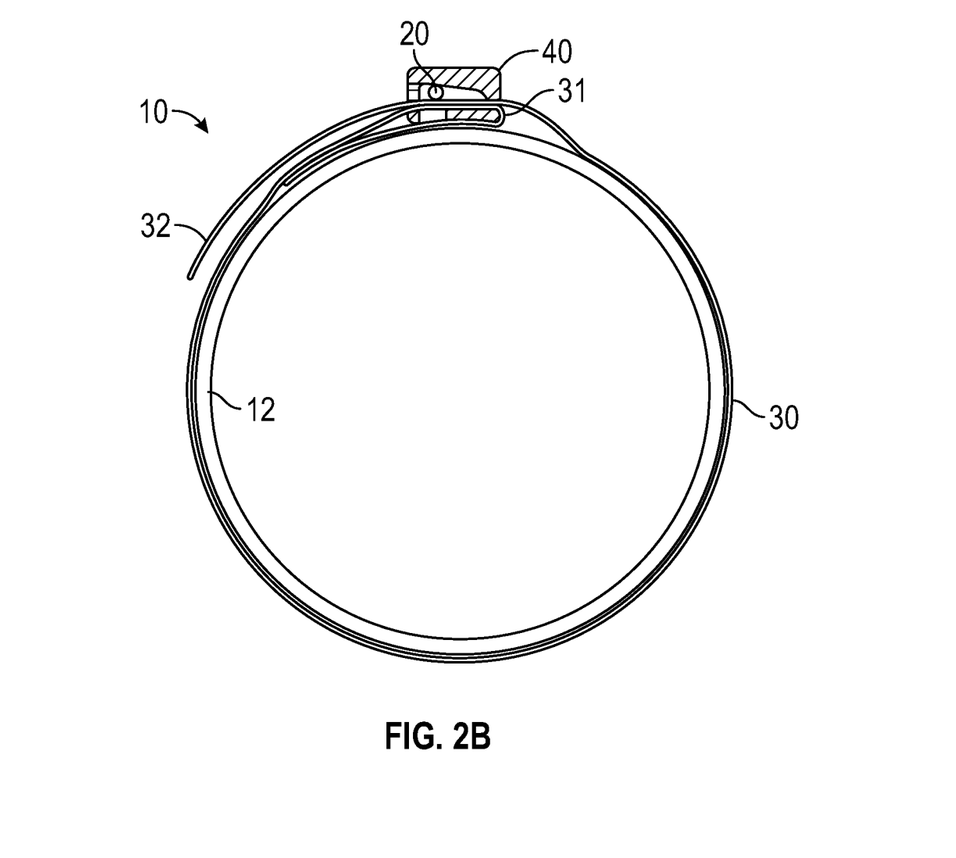
FIGS. 2B and 2C are cross-sectional views of the fastening assembly of FIG. 2A as described in at least one embodiment herein.
Figure 2C:
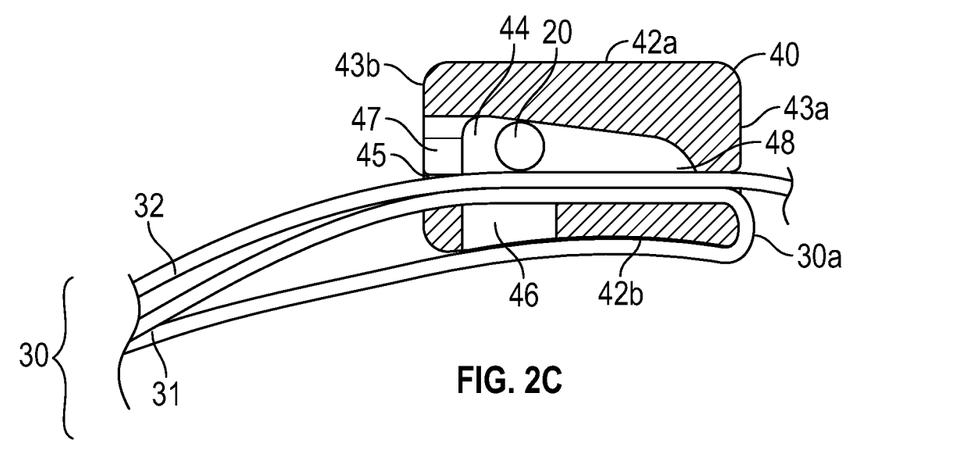

FIGS. 2A-2C depict a fastening assembly 10 as described herein configured to be used with a solar power system. The assembly 10 includes a locking member 20, a strap 30, and a buckle member 40. The strap 30 includes an elongate body extending between a first end portion 31 and an opposite second end portion 32. The strap 30 has a length greater than its width. The strap 30 may be made of any suitable material including but not limited to leather, metal, plastics, rubber, and the like. The strap may be selected from the group consisting of a weave, a knit, a braid, or combinations thereof.

The fastening assembly 10, as shown particularly in FIG. 2B, is configured to be wrapped around a support structure 12, such as a torque tube, mounting rail, saddle, etc., of a solar power system to secure another support structure and/or solar module thereto. The solar module and/or additional support structure are not shown in FIGS. 2A-2C to better visualize the fastening assembly. Although the support structure 12 is depicted in FIGS. 2A-2B to define a generally circular cross-section, the fastening assembly 10 described herein may be utilized with a support structure 12 of any particular cross-sectional dimension, such as a cross-section which is elliptical or polygonal (e.g., triangular, square, rectangular, octagonal, etc.).

FIGS. 2B-2C depict a cross-sectional view of the buckle member 40 in an unlocked configuration. In the unlocked configuration a first end portion 31 of the strap 30 is secured to the a portion of the buckle member 40 and the second end portion 32 of the strap 30 is configured to freely pass into or out of the buckle member 40.

The buckle member 40 may define any polygonal or circular shape. In some embodiments, as particularly shown in FIGS. 2A-2C, the buckle member 40 may define a generally rectangular shape including a front face 41a and an opposite rear face 41b, a top face 42a and opposite bottom face 42b, and a first side face 43a and an opposite second side face 43b. The buckle member 40 includes a locking cavity 44 defined therein and a strap channel 45 defined therethrough. The locking cavity 44 may be in communication with the strap channel 45. The locking cavity 44 is positioned on top of the strap channel 45. The strap channel 45 is configured to receive the strap 30 through the buckle member 40. The strap channel 45 has a width generally equal to or slightly greater than the width of the strap 30. As depicted, the strap channel 45 extends from a portion of the first side face 43a to a portion of the second side face 43b completely through the buckle member 40.

In some embodiments, the first end portion 31 of the strap 30 forms a loop 30a secured to the buckle member 40 by extending from the second side face 43b through the strap channel 45 and exiting out the first side face 43a to wrap back around the bottom face 42b beyond the second side face 43b to close the loop. The second end portion of the strap 32 is free of the buckle member 40 and configured to be passed through the buckle member 40 after being wrapped around the support structure 5.

As further depicted in FIGS. 2B-2C, the locking cavity 44 is configured to receive a locking member 20 therein. Unlike the strap channel 45, the locking cavity 44 does not extend to both the first and second side faces 43a, 43b. In some embodiments, the locking cavity 44 further includes an opening 46 extending from the bottom face 42b. The opening 46 being in communication with both the locking cavity 44 and the strap channel 45. The opening 46 is designed to introduce and/or remove the locking member 20 from the locking cavity 44 when the buckle member 40 and/or the strap channel 45 is free of any strap.

Figure 3A:
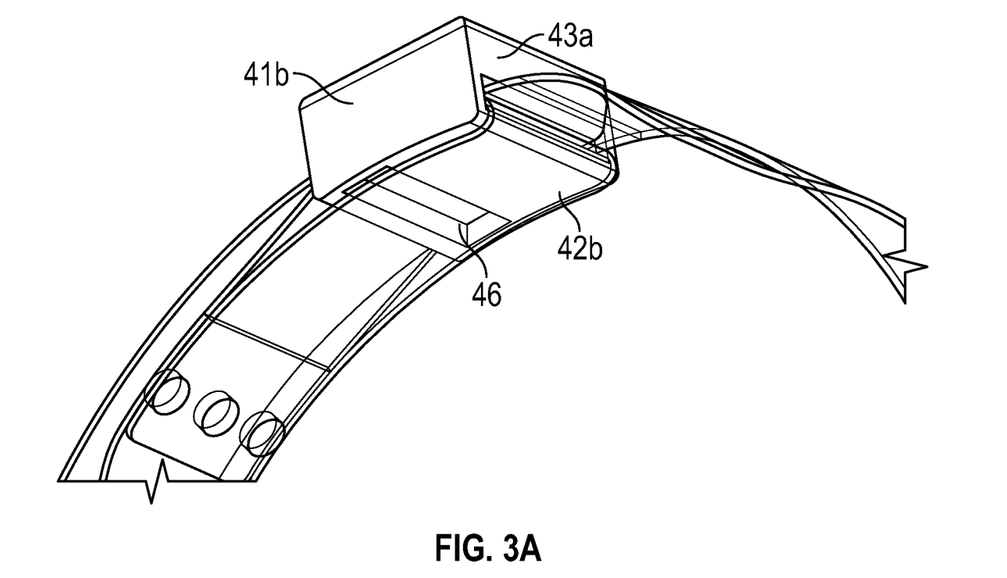
FIG. 3A is a perspective view of a fastening assembly as described in at least one embodiment herein.
Figure 3B:
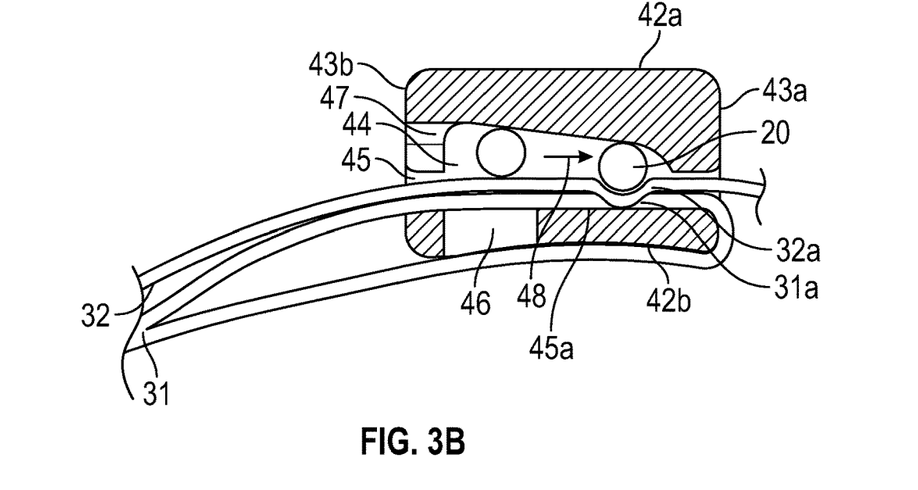
FIG. 3B is a cross-sectional view of the fastening assembly of FIG. 3A as described in at least one embodiment herein.

As depicted in FIGS. 2B-2C, the locking cavity 44 narrows from one end to another and/or includes a tapered end portion 48. The tapered end portion 48 is configured to receive the locking member 20 therein to lock the strap 30 in a fixed position relative to the buckle member 40, and particularly, within the strap channel 45 of the buckle member 40 (FIGS. 3B and 4B).

As further depicted in FIGS. 2A-2C, the buckle member 40 may also include a slot 47 in communication with both the locking cavity 44 and the strap channel 45. The slot 47 is defined through the second side face 43b of the buckle member 40 and on top of strap channel 45. The slot 47 is configured to advance a strapping tool and/or pusher device (not shown in FIGS. 3A-3D) therein to advance the locking member 20 towards the tapered end portion 48 of the locking cavity 44.

The slot 47 defines a width which is smaller and/or narrower than the width of the strap 30, the width of the strap channel 45, and/or the width of the locking cavity 44. The narrower slot 47 prevents the locking member 20 from falling out and/or being removed from the locking cavity 44 through the second sidewall 43b. The narrower slot 47 may also prevent the strap 30 from entering the slot 47 and/or locking cavity 44.

In FIGS. 2A-2C, the fastening assembly 10 is shown in an unlocked configuration wherein the locking member 20 fails to pinch or lock the strap 30 to the buckle member 40. In FIGS. 3A-3B, the fastening assembly 10 is shown in a locked configuration wherein the locking member 20 is positioned within the tapered end portion 48 of the locking cavity 44 to pinch or lock the overlapping parts of the strap 30 to the buckle member 40.

FIG. 3B a cross-sectional view of the buckle member 40 in a locked configuration. In the locked configuration, the second end portion 32 of the strap 30 is locked into position inside the locking cavity 44 by the locking member 20. As the locking member 20 advances into the tapered end portion 48 of the locking cavity 44, the narrowing of tapered end portion 48 causes the locking member 20 into a part 32a of the second end portion 32 of the strap 30 positioned within the buckle 40 (and/or strap channel 45) pinching the part 32a of the second end portion 32 of the strap 30 between the locking member 20 and a part 31a of the first end portion 31 of the strap 30 also positioned within the buckle 40 (and/or strap channel 45) and the bottom surface 45a of the strap channel 45.

Figure 4A:
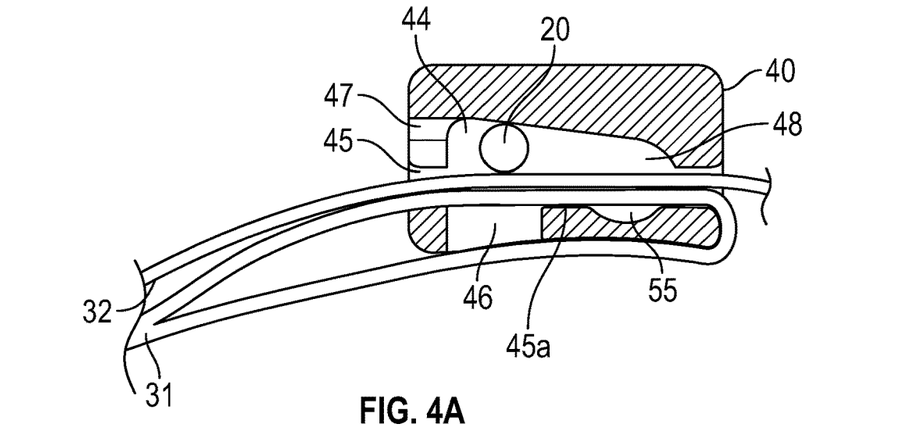
FIGS. 4A and 4B are cross-sectional views of a fastening assembly as described in at least one embodiment herein.
Figure 4B:
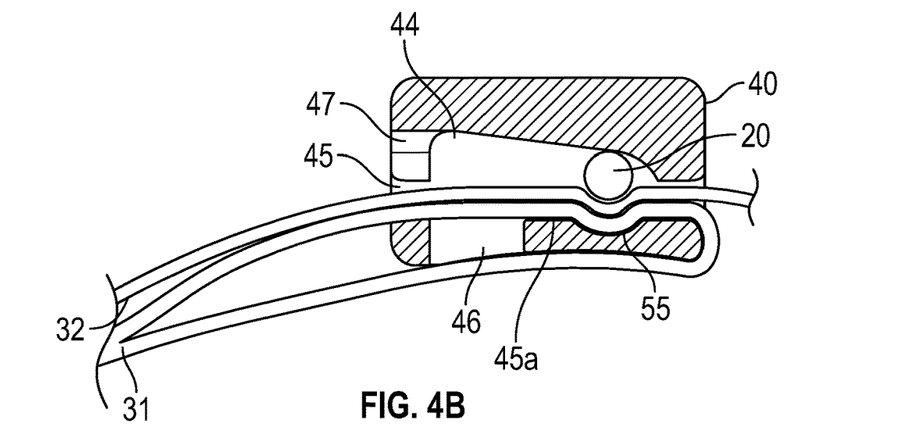

As depicted in FIGS. 4A and 4B, in some embodiments, the strap channel 45 (and/or locking cavity 44) may further include a recess 55 defined with the bottom surface 45a of the strap channel in the tapered end portion 48 of the cavity 44. The recess 55 enhance the locking member's 20 ability to secure the strap 30 to the buckle member 40 thereby increasing the overall locking strength of the fastening assembly.

In FIG. 4A, the fastening assembly 10 is shown in an unlocked configuration wherein the locking member 20 fails to pinch or lock the strap 30 to the buckle member 40. In FIG. 4B, the fastening assembly 10 is shown in a locked configuration wherein the locking member 20 is positioned within the tapered end portion 48 of the locking cavity 44 to pinch or lock the overlapping parts of the strap 30 to the buckle member 40 with the locking member 20 positioned within the recess 55.

Figure 5:
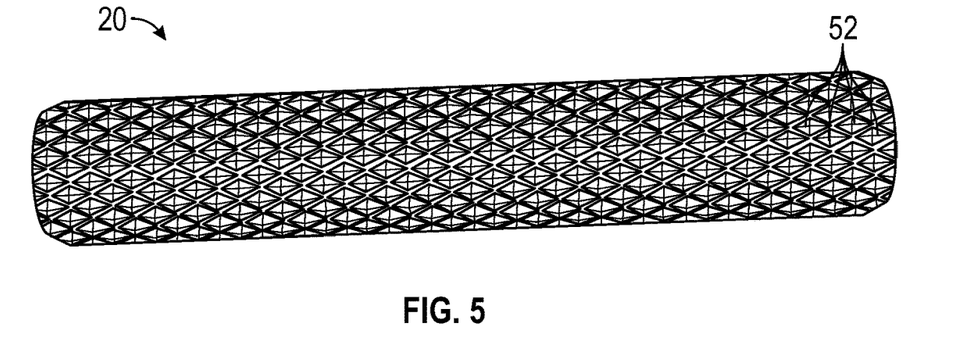
FIGS. 5-7 depict perspective views of various locking members as described in at least one embodiment herein.
Figure 6:
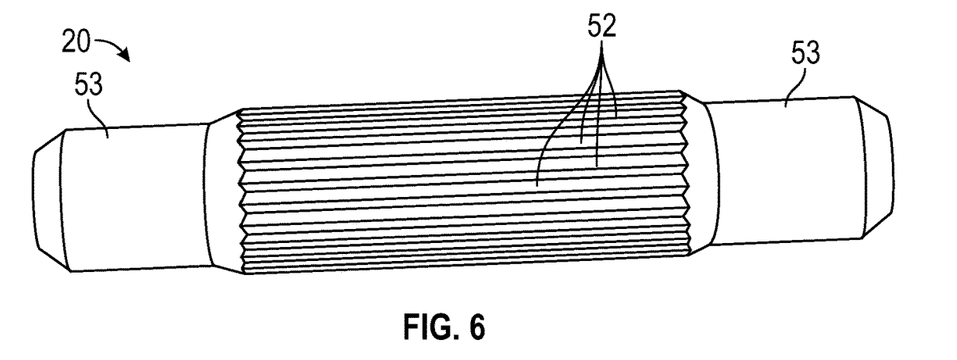
Figure 7:
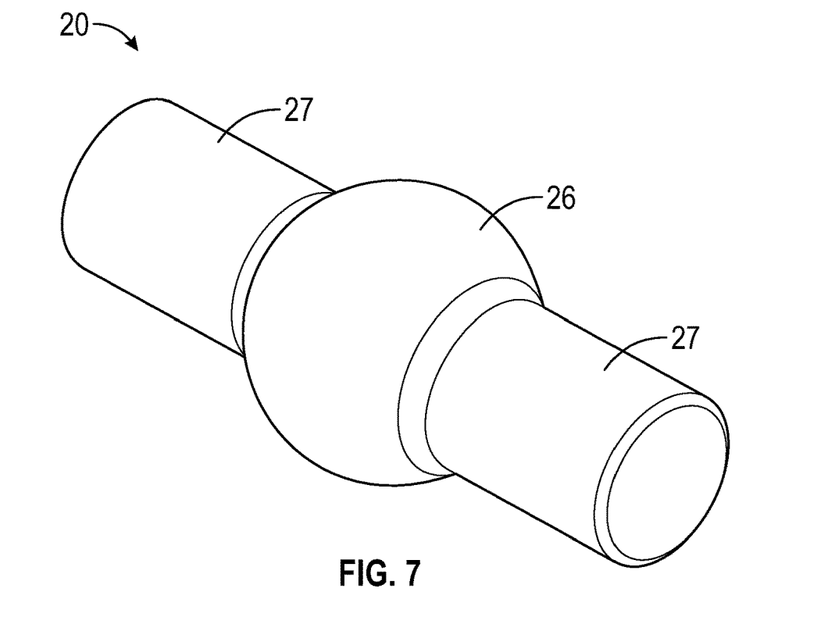

As shown in FIGS. 5-7, the locking member 20 may be useful in various different shapes. For example, as shown in FIG. 5, in some embodiments, the locking member 20 may be a rod including a plurality of grip-enhancing features 52, such as barbs, extending therefrom to enhance the gripping ability of the locking member 50. In some embodiments, at least a majority, if not all, of the outer surface of the locking member 20 may include grip-enhancing features. In another example, as shown in FIG. 6, in some embodiments, the locking member 20 may be a rod including grip-enhancing features 52, such as longitudinal ridges, extending on an outer surface thereof along a longitudinal axis of the locking member 20. The features 52 extending between smooth and/or non-gripping ends 53. In yet another example, as shown in FIG. 7, in some embodiments, the locking member 20 may include a generally circular (or elliptical) ball 26 centered between two rod-like opposite ends 27. In some embodiments, the locking member 20 may be free of any texture and/or gripping enhancing barbs, ridges, etc. The locking members 20 described herein may be made of any suitable material including, but not limited to, metal, plastic, and/or ceramic materials.

Figure 8:
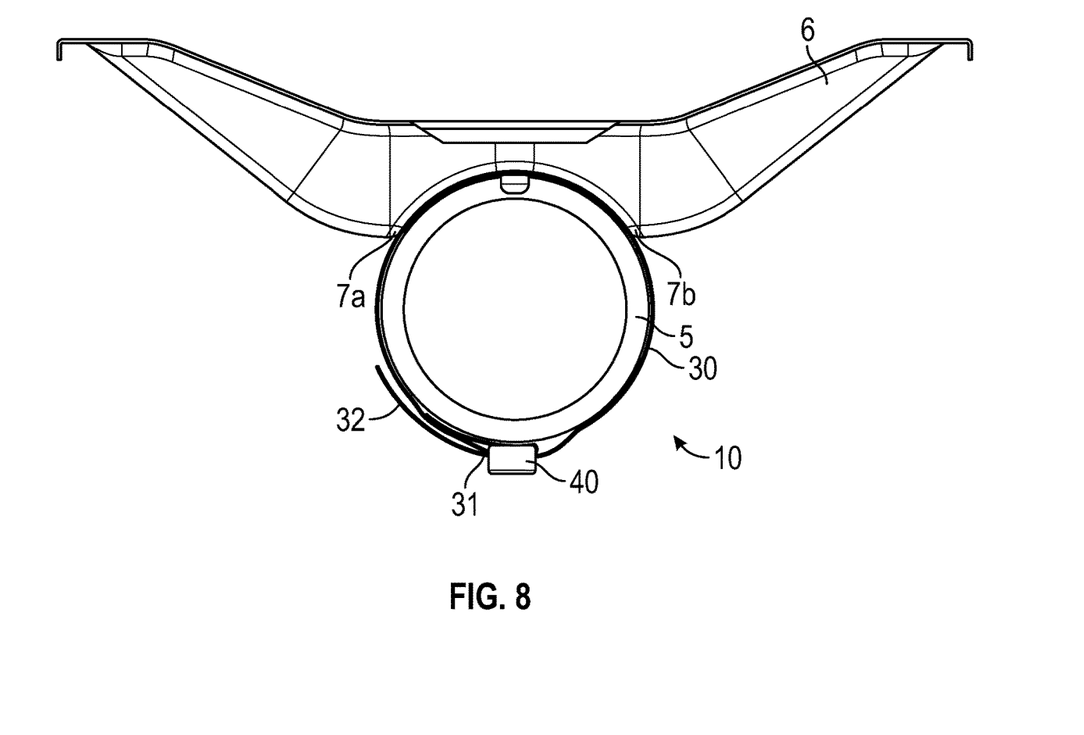
FIG. 8 depicts a side view of a first support structure fastened to a second support structure of a solar power system via a fastening assembly as described in at least one embodiment herein.

FIG. 8 illustrates a fastening assembly 10 as described herein securing a first support structure, such as a torque tube 5, to a second support structure, such as saddle 6 configured to support solar panels (not shown). The saddle 6 includes a first and second slit 7a, 7b on opposite sides of the saddle 6 configured to pass the strap 30 therethrough as the strap 30 is wrapped around the outer perimeter or circumference of the torque tube 5 and then passed through the buckle member 40 and locked into place by the advancing the locking member towards the tapered end portion of the buckle member 40.

As depicted in FIG. 8, the fastening assembly 10 is configured to be fastened from underneath the support structure or torque tube 5. Fastening from underneath the support structures can be easier and less time-consuming because beneath the primary support structure may often be where the most open space to operate is in a solar power system because the solar modules are commonly positioned on top of the support structures and not below. In addition, the first support structure 5 may bear the weight of any additional support structures and/or solar modules positioned thereon while the fastening assembly is tightened and ultimately locked thereto.

Figure 9A:
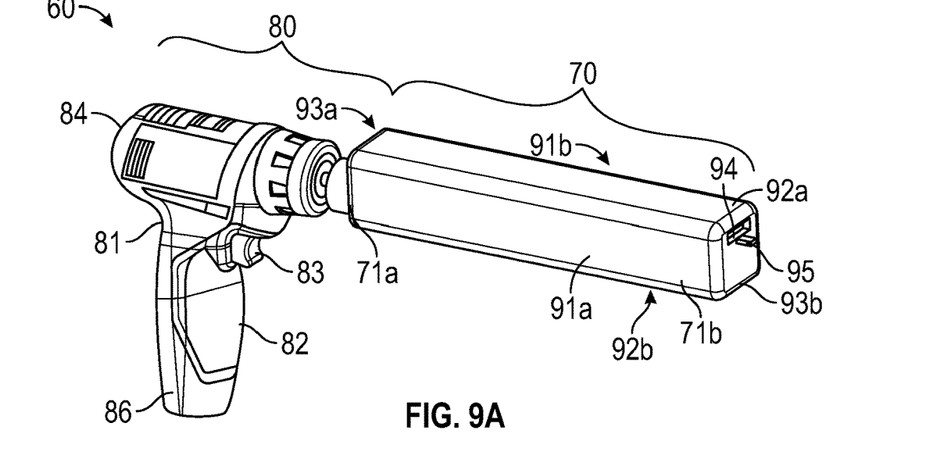
FIGS. 9A and 9B depict a perspective and side view, respectively, of a hand-held strap tensioning tool as described in at least one embodiment herein.
Figure 9B:
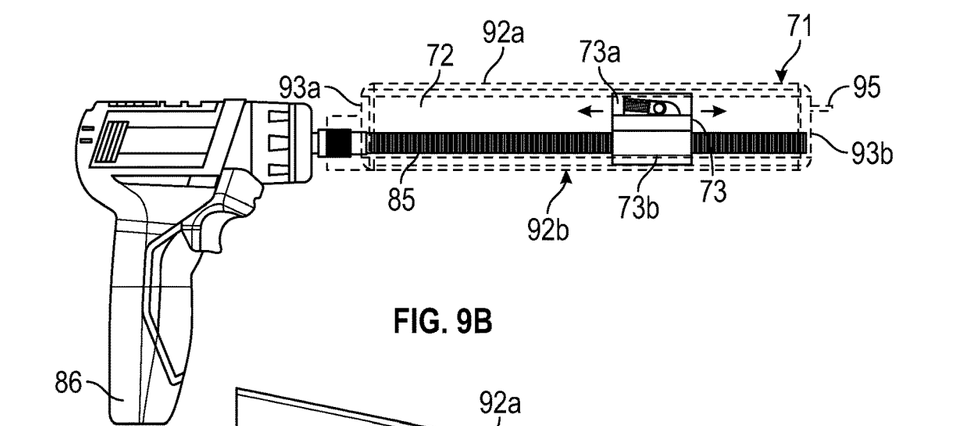

FIGS. 9A-9B depict at least one embodiment of a hand-held tensioning tool 60 designed to apply tension and/or pull on a strap as described herein. The tensioning tool 60 includes a strap tensioning tool assembly 70 operatively coupled to a power assembly 80. The strap tensioning tool assembly 70 is configured to perform one or more strap tensioning operations, including pulling on the free end of the strap, maintaining tension on the free end of the strap, advancing of the locking member inside the buckle member, cutting of the free end portion of the strap after locking of the strap to the buckle member, and/or crimping of the buckle member after locking of the strap to the buckle member.

In some embodiments, the power assembly 80 includes a power drill 81 configured to drive the strap tensioning tool assembly 70 and a power source 86 configured to power the power drill 81. The power drill 81 may be of any commonly known drills.

In some embodiments, the power drill 81 may include at least a handle 82, a trigger 83, a gear-driven rotary motor 84, and a drive screw 85. The motor 84 configured to rotate the drive screw 85 in a clockwise and/or counterclockwise direction.

In some embodiments, the power source 86 may be stored in and/or extend from the handle 82. The power source 86 may include one or more of a battery, electricity from a power grid, a fuel cell-based system, or compressed air.

Figure 9C:
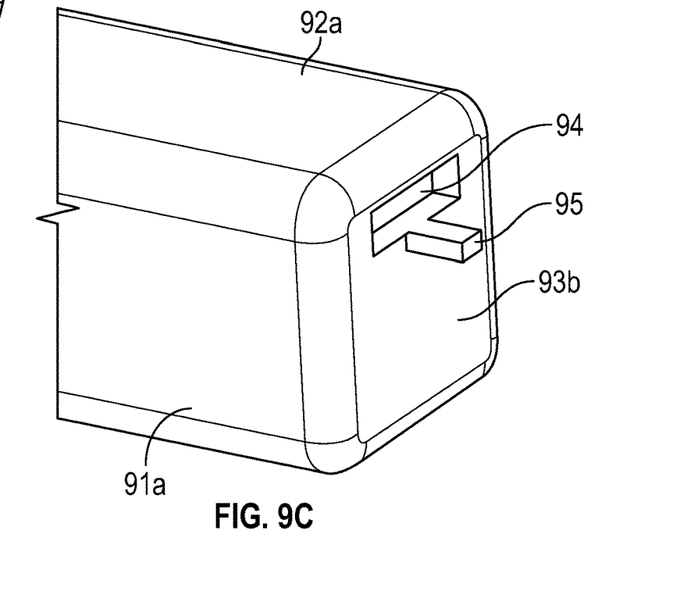
FIG. 9C is a perspective end view of a strap tensioning tool assembly of the hand-held strap tensioning tool of FIGS. 9A-9B as described in at least one embodiment herein.

As further illustrated in FIGS. 9A-9C, the strap tensioning tool assembly 70 may include an elongate housing 71 configured to attach to the power assembly 80, and particularly the power drill 81, via the drive screw 85. The housing 71 defines a chamber 72 configured to receive the drive screw 85 therein. The housing 71 attached to the drill 81 on a first end portion of the housing.

In some embodiments, the housing 71 defines a generally rectangular housing defining a generally rectangular chamber 72. The housing 71 including a front face 91a and an opposite rear face 91b, a top face 92a and opposite bottom face 92b, and a first side face 93a and an opposite second side face 93b. The second side face 93b includes a protrusion 95 extending longitudinally therefrom and an insert aperture 94 sized and dimensioned to receive a strap, and particularly a free end portion of the strap, therethrough. The insert aperture 94 being of similar shape as strap channel 45. The protrusion 95 may be located above the insert aperture 94. The protrusion 95 is configured to enter the slot 47 of the buckle member 40 to advance the locking member 20 towards the tapered end portion 48 of the locking cavity 44. In some embodiments, the protrusion 94 may be used to positively engage the locking member 20 after the strap 30 is at or near a sufficient tension to secure the buckle member 40 to the support structure 5.

Figure 9D:
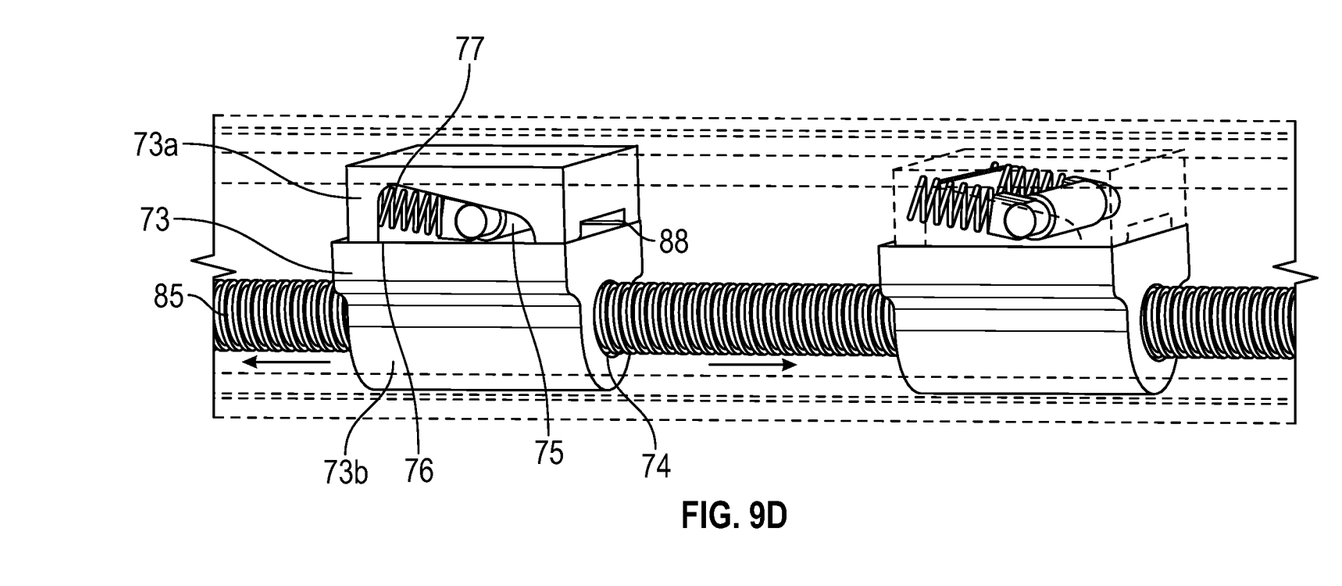
FIGS. 9D and 9E are cross-sectional views the strap tensioning tool assembly of FIG. 9C as described in at least one embodiment herein.
Figure 9E:
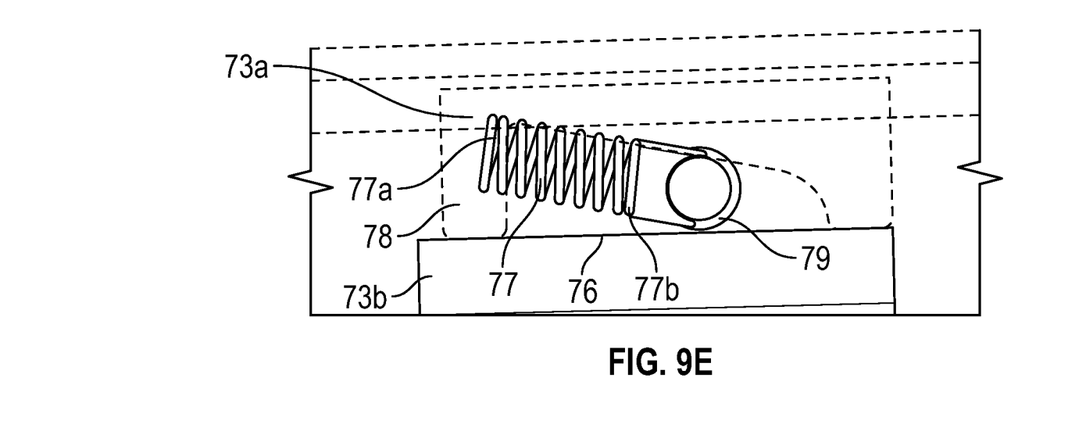

As shown in FIGS. 9C and 9D, the housing 71 further includes a carriage 73 positioned therein. The carriage 73 includes a cover portion 73a and a base portion 73b. The base 73b includes a threaded lumen 74 defined therein, the threaded lumen 74 configured to receive the drive screw 85 therein. The carriage 73 includes a strap chamber 75 positioned between a top 76 of the base 73b and the cover portion 73a. The strap chamber 75 is configured to receive and maintain the free second end portion 32 of a strap 30 therein. The strap chamber 75 includes one or more springs 77 positioned at an angle on top of the base 73b. The springs 77 may be anchored to the top of the base on a first end 77a by a mount 78 and secured to a wedging member 79 on a second opposite end 77b. The springs 77 may be configured to force the wedge member 79 against the top surface 76 of the base 73b of the carriage 73. The springs 77 and wedge member 79 are operatively connected to pinch and/or secure a free second end portion 32 of the strap 30 between the wedge member 70 and the top surface 76 of the base 73b. The cover portion 73a sits on top of the base 73b, and particularly covering the one or more springs 77 and the wedge member 79. The spring/wedge assembly may be configured to secure the strap to the movable carriage. The carriage 73 further includes at least one carriage openings 88 positioned on a side of the carriage 73 to allow passage of the free second end portion 32 of the strap 30 into the carriage 73.

As further shown in FIGS. 9C-9D, the carriage 73 sits on the drive screw 85 via the threaded lumen 84. Rotation of the drive screw 85, via the power drill 80, in a first direction, e.g., clockwise, or counterclockwise, causes the carriage 73 to move linearly in a first direction (e.g., forward or towards the power drill 80) along the screw drive 85 while the housing 71 remains stationary. When a strap 30 is anchored to the carriage 73, forward movement of the carriage 73 will draw the strap 30 further into the housing 70. This may also cause the strap 30 to be pulled through the buckle member 40 and tighten the strap 30 around the support structure.

Rotation of the drive screw 85, via the power drill 80, in a second direction, e.g., counterclockwise, or clockwise, causes the carriage 73 to move linearly in a second direction (e.g., reverse or away from the power drill 80) along the screw drive 85 opposite the first direction. When a strap 30 is anchored to the carriage 73, reverse movement of the carriage 73 may loosen the strap 30 around the support structure and/or may be used to remove the strap 30 from the housing 70 once locked in place in the buckle member 40.

Conversion of the drive screw rotation into linear motion of the carriage also creates tension to the strap when secured within the spring/wedge assembly of the carriage. Exact motion and/or tension can be adjusted by a clutch or gear on the power drill and/or also by the pitch of the threads on the screw drive and/or threaded lumen o the carriage. A load cell may also be included to measure the force on the strap.

The housing may further include one or more cutting devices, such as a knife, pincher, laser-cutting device, ultrasonic cutting device, etc. The cutting device may be positioned on any portion of the housing suitable for cutting the strap contained therein. In some embodiments, the cutting device may be on an inner or outer surface of the second side face of the housing. In some embodiments, the cutter may be positioned somewhere along a length of the strap chamber.

Figure 10A:
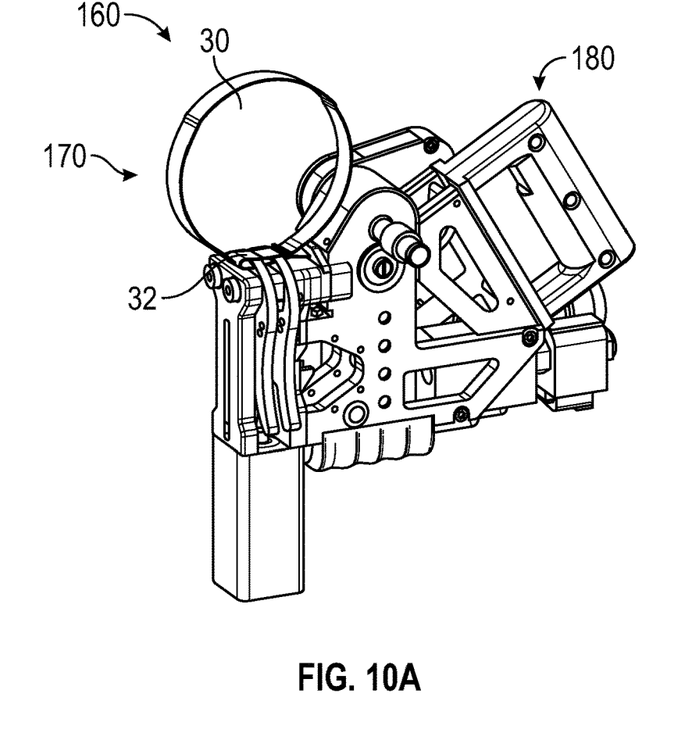
FIG. 10A is a perspective view of hand-held strap tensioning tool as described in at least one embodiment herein.
Figure 10B:
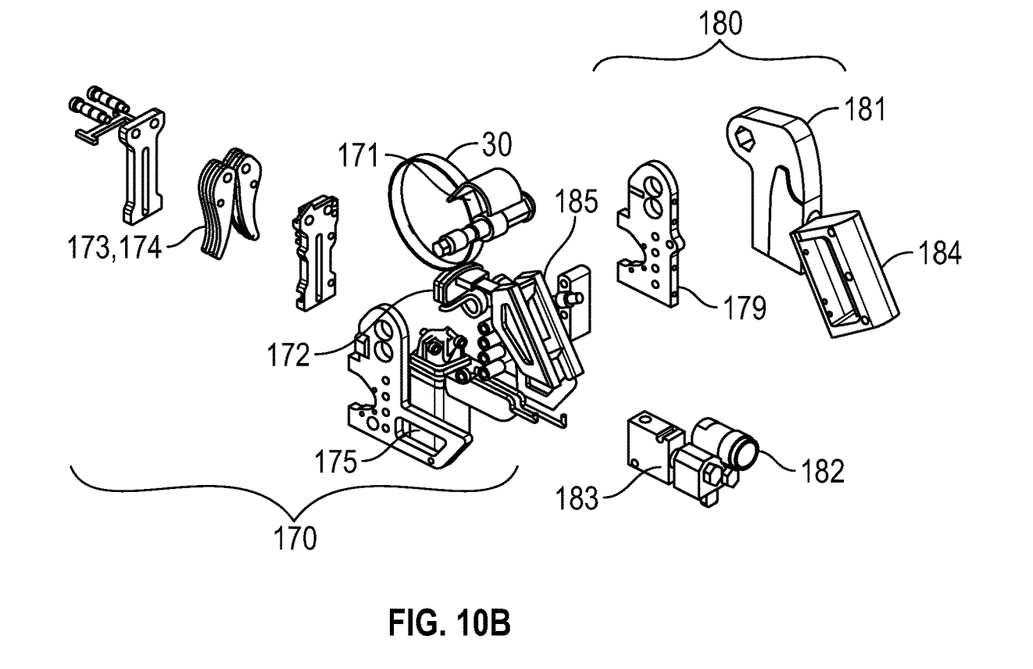
FIG. 10B is an expanded view of the strap tensioning tool of FIG. 10A as described in at least one embodiment herein.

FIGS. 10A-10B depict at least one embodiment of a hand-held hydraulic tensioning tool 160 designed to apply tension and/or pull on a strap as described herein. The tool 160 includes a strap tensioning tool assembly 170 operatively coupled to a hydraulic power assembly 180. The strap tensioning tool assembly 170 is configured to perform one or more strap tensioning operations, including pulling on the free end of the strap, maintaining tension on the free end of the strap, advancing of the locking member inside the buckle member, cutting of the free end portion of the strap after locking of the strap to the buckle member, and/or crimping of the buckle member after locking of the strap to the buckle member In some embodiments, the hydraulic power assembly 180 includes a base frame 179 upon which a hydraulic ratchet 181, hydraulic hose fittings 182, a solenoid 183, a handle 184, and a power source 185 may be individually or collectively secured thereto. The hydraulic power assembly 180 is configured to drive the strap tensioning tool assembly 170. The use of hydraulics may not only provide additional tension to the strap 30 but also may provide the additional power needed to properly crimp the buckle member 40. In some embodiments, to achieve a high level of tension, the tensioning tool 160 may use hydraulics to provide both a high level of tension and also to actuate the crimping mechanism when the proper tension level is achieved. The ratchet 181 helps release and/or apply more torque when needed. The hydraulic power assembly 180 may be of any commonly known assemblies.

As further illustrated in FIGS. 10A-10B, the strap tensioning tool assembly 170 may include a plurality of interconnected parts operatively coupled to each other and/or the hydraulic power assembly 180. The tool assembly 170 may include at least a wheeled-type tensioning mechanism 171 configured to apply tension to a free end portion 32 of a strap 30, a strap cutting device 172, one or more pairs of crimper jaws 173, 174 configured to crimp the buckle member, and a hydraulic cylinder 175 operatively coupled to the crimper, cutter, and/or tensioning mechanism. The tool assembly 170 is also attached to the tool frame 179.

Figure 11A:
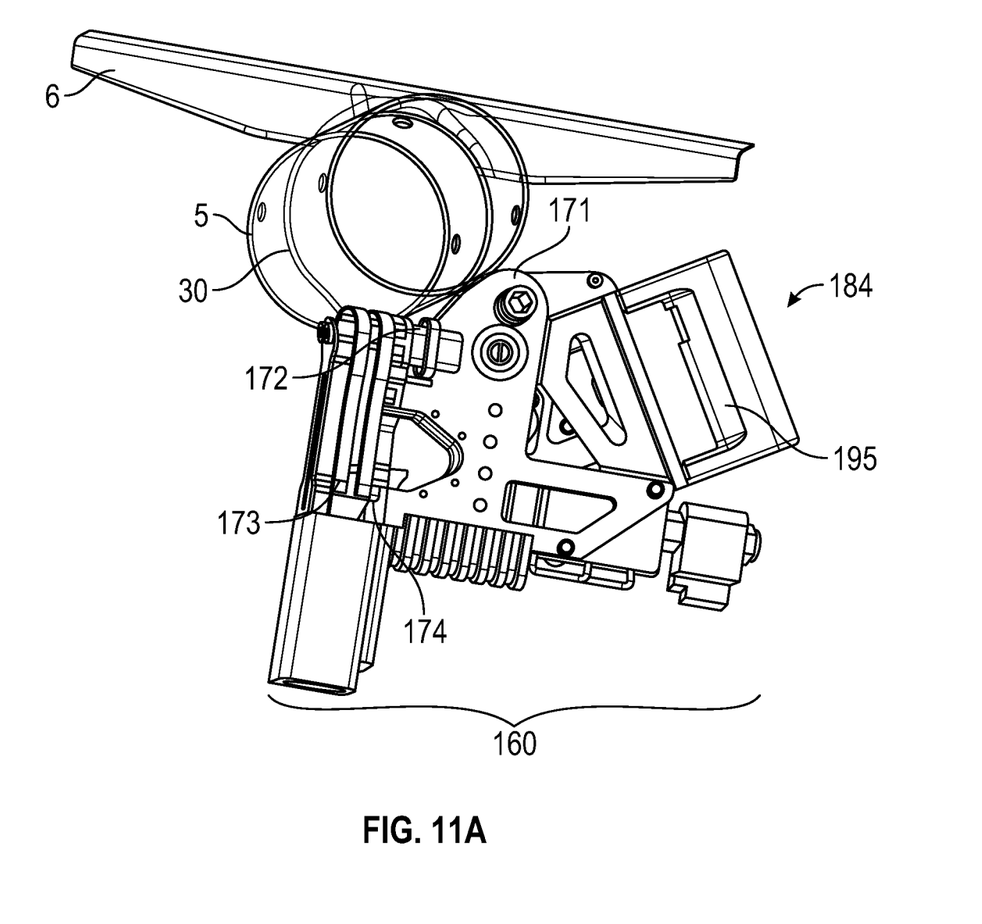
FIGS. 11A and 11B are a perspective and side view, respectively, of a hand-held strap tensioning tool in combination with fastening assembly as described in at least one embodiment herein.
Figure 11B:
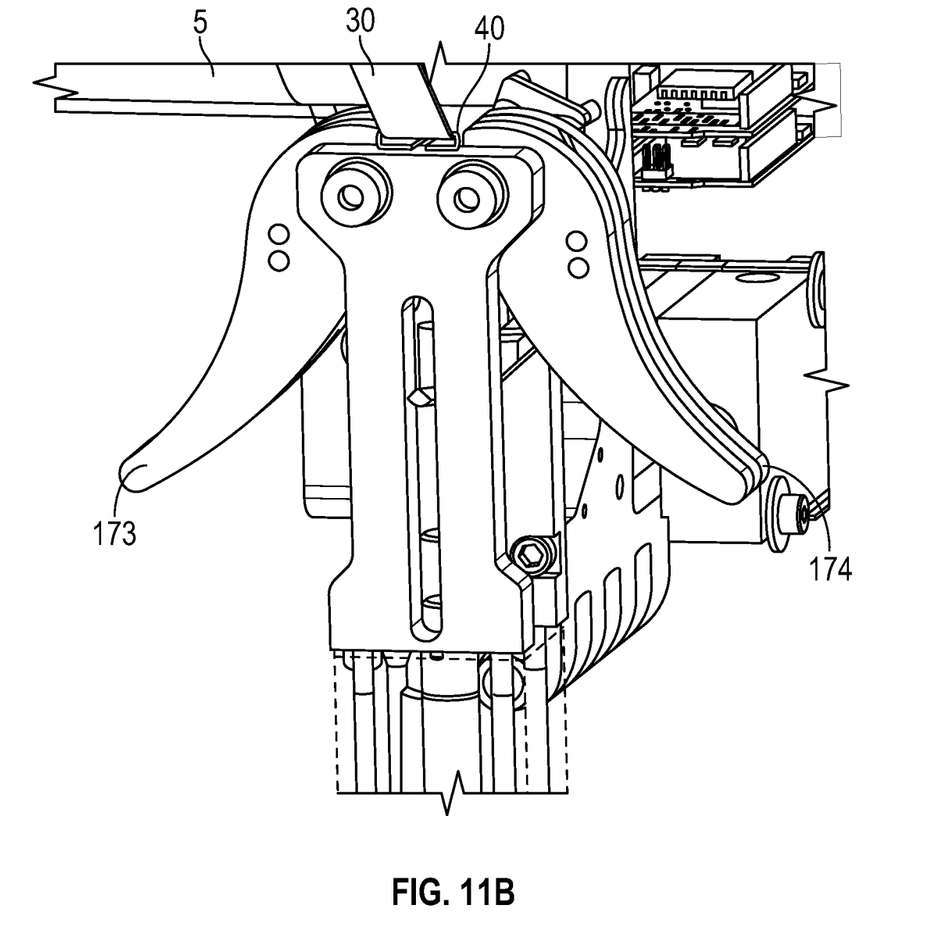

FIGS. 11A-11B depict a saddle rail 6 secured to a torque tube 5 using a fastening assembly 10 as described herein, and/or particularly a strap 30, a buckle member 40, and a locking member (not shown). A hydraulic tensioning tool 160 may be deigned to come in from beneath the torque tube and/or rail to apply tension to the strap and/or fasten the fastening assembly 10 to the torque tube 5. The handle 184 includes one or more triggers 195 designed to, individually or collectively, activate the wheel-type tensioning mechanism 171, the crimping jaws 173, 174, and/or the strap cutting device 172, when pressed upon.

As further depicted in FIG. 11A, the hydraulic tensioning tool 160 may include a wheel-type tensioning mechanism 171, such as knurled tensioning wheel, to apply tension to the strap 30. In some embodiments, tension is applied to the strap 30 using the wheel-type mechanism 171 while the buckle member 40 is positioned within one or more of the crimping jaw members 173. In some embodiments, the buckle member 40 is free of a locking member. In some embodiments, the buckle member 40 includes a locking member 20.

As further depicted in FIG. 11B, the one or more pairs of crimping jaw members 173 are configured to act on the buckle member 40 perpendicular to the wheel-type tensioning mechanism 171 to crimp the buckle member 40 onto the strap 30 under tension. The crimping jaw members 173 are designed to pivot between an open position (as shown in FIGS. 11A/11B) and a crimping position (as shown in FIGS. 10A/10B). In the open position, the jaw members are spaced sufficiently apart to receive the buckle member therebetween. In the crimping position, the jaws 173 are pressed towards each other with sufficient force to deform at least a portion of the buckle member 40 about the strap 30. After crimping the excess strap 30 may remain or be removed from the assembly 10.

Methods of forming a solar tracker system are also provided. The methods include positioning one or more of the fastening assemblies described herein around a first support structure, such as a torque tube, and at least a part of a solar related device, such as a solar module, and/or a supplemental support structure (e.g., a saddle or mounting rail), to connect the device to the first support structure, and tightening and/or locking the assembly to affix the device to the support structure in a generally stationary manner.

In some embodiments, positioning of one or more assemblies may include wrapping a free second end of a strap around an outer perimeter of a support structure and passing the free end of the strap through at least a portion of a solar related device, before passing the second free end of the strap back through and out of a buckle member. Because the opposite first end of the strap is secured the buckle member via the loop on the first end of the strap, once the second free end of the strap is passed through the buckle member, the strap forms a closed shape mirroring the shape of the outer perimeter of the support structure. For example, the strap may generally form a circular closed shape when wrapped around a support structure having a generally circular cross-section. Any closed shape, e.g., rectangular, triangular, etc., may be envisioned.

Initially, in some embodiments, the fastening assembly, and particularly the strap, may be loosely wrapped about the support structure and/or through at least a portion of the related solar device and/or through the buckle member to loosely connect the solar related device to the support structure in an unlocked configuration and/or prior to tightening. After the second free end of the strap is passed through the buckle member, the second free end of the strap may be pulled upon to further extend away from the buckle member until the strap is tightly wrapped about the support structure and/or through the solar related device to secure the device to the support structure. At the same time and/or thereafter, the locking member positioned within the buckle member may be advanced towards a locked position nearest the tapered portion of the locking cavity to lock the strap within the buckle member while tightened to lock and/or fix the position of the solar related device to the torque tube. Pulling of the second free end of the strap may be performed by hand, e.g., manually, or by any of the tightening tools described in.

In some embodiments, a power strap tensioning tool assembly may be used to tighten the strap. For example, in some embodiments, the power tool assembly of FIGS. 9A-9E may be used to tighten the strap. In another example, in some embodiments, the power tool assembly of FIGS. 10A-11B may be used to tighten the strap. In addition to tightening of the strap, the methods described herein may further include the steps of maintaining tension on the free end of the strap, advancing of the locking member inside the buckle member, cutting of the free end portion of the strap after locking of the strap to the buckle member, and/or crimping of the buckle member.

In some embodiments, the fastening assemblies described herein may be part of kit for a solar power system. Such kits may include one or more fastening assemblies as described herein and at least one of a support structure, a solar related device, or both. The fastening assembly including at least a strap, a buckle member, and a locking member.

In some embodiments, the kits described herein may include one or more fastening assemblies as described herein and one or more saddles or mounting rails for connecting a solar panel to a support structure, and optionally one or more solar panels and/or one or more support structures such as a torque tube.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. A fastening assembly for a solar power system comprising
   a locking member,
   a strap including an elongate body extending between a first end portion and an opposite second end portion,
   a buckle member having a locking cavity defined therein and a strap channel defined therethrough, the locking cavity in communication with the strap channel, the strap channel configured to receive a portion of the strap through the buckle member and the locking cavity including a tapered end portion configured to receive the locking member therein to lock the strap in a fixed position relative to the buckle member, wherein the buckle member further comprises an opening in communication with the locking cavity, the opening defined through the buckle member, and the opening configured to pass the locking member through the opening into or out of the buckle member, wherein the locking member comprises a first rod portion at a first end portion of the locking member and a second rod portion at a second end portion of the locking member, the second end portion being opposite the first end portion, and wherein the opening comprises a width defined along a bottom face of the buckle member, and wherein the width allows the first rod portion and the second rod portion to pass through the opening into or out of the buckle member.

2. The fastening assembly of claim 1, wherein the buckle member further comprises a top face, a bottom face opposite the top face, a front face, a rear face opposite the front face, a first side face, and a second side face opposite the first side face, wherein the strap channel extends from a portion of the first side face to a portion of the second side face through the buckle member.

3. The fastening assembly of claim 2, wherein the opening is defined through the bottom face of the buckle member and is configured to pass the locking member therethrough into or out of the locking cavity.

4. The fastening assembly of claim 3, wherein the first end portion of the strap includes a loop defining a strap aperture defined to receive a bottom portion of the buckle therein, the loop wrapped around the bottom portion of the buckle and configured to pass through at least a portion of the strap channel and around the bottom face of the buckle member to secure the first end portion to the buckle member with the second end portion of the strap free of the buckle member.

5. The fastening assembly of claim 4, wherein the loop passes through the strap channel and the opening before looping around the bottom face of the buckle member.

6. The fastening assembly of claim 2, wherein the buckle member further comprises a slot in communication with the locking cavity and the strap channel, the slot defined through the first side face of the buckle member and configured to pass a tightening tool therein to advance the locking member towards the tapering portion of the locking cavity.

7. The fastening assembly of claim 6, wherein the slot is narrower than the strap channel to prevent the strap from entering the slot.

8. The fastening assembly of claim 2, wherein the wherein the locking cavity is positioned above the strap channel.

9. The fastening assembly of claim 1, wherein the locking member comprises a cylindrical rod, circular ball, or a combination of both.

10. The fastening assembly of claim 9, wherein the locking member further comprises a texture on at least a portion of an outer surface thereof.

11. The fastening assembly of claim 1, wherein the strap is selected from the group consisting of a weave, a knit, a braid, or combinations thereof.

12. The fastening assembly of claim 1, wherein the locking member further comprises a ball between the first rod portion and the second rod portion, wherein the width allows the first rod portion, the second rod portion, and the ball to pass through the opening into or out of the buckle member.

13. The fastening assembly of claim 12, wherein the width is greater than a diameter of the ball.

14. A fastening assembly for a solar power system comprising:
a locking member,
a strap including an elongate body extending between a first end portion and an opposite second end portion, and
a buckle member having a locking cavity defined therein and a strap channel defined therethrough, the locking cavity in communication with the strap channel, the strap channel configured to receive a portion of the strap through the buckle member and the locking cavity including a tapered end portion configured to receive the locking member therein to lock the strap in a fixed position relative to the buckle member,
wherein the buckle member further comprises an opening in communication with the locking cavity, the opening defined through the buckle member, and the opening configured to pass the locking member through the opening into or out of the buckle member,
wherein the locking member comprises a first rod portion at a first end portion of the locking member and a second rod portion at a second end portion of the locking member, the second end portion being opposite the first end portion, and wherein the opening comprises a width defined along a bottom face of the buckle member, and wherein the opening comprises a rectangular cross-sectional geometry at the bottom face of the buckle member.

* * * * *